United States Patent [19]

Shimazaki et al.

[11] Patent Number: 4,645,893
[45] Date of Patent: Feb. 24, 1987

[54] METHOD FOR MANUFACTURING SPIRAL-WELDED STEEL PIPE

[75] Inventors: Yasumi Shimazaki, Kitakyushu; Yoshito Tsuyama, Tokyo; Hiroyo Haga, Sagamihara; Manabu Hanzawa, Kitakyushu, all of Japan

[73] Assignee: Nippon Steel Corporation, Tokyo, Japan

[21] Appl. No.: 783,042

[22] Filed: Sep. 30, 1985

Related U.S. Application Data

[63] Continuation of Ser. No. 507,225, Jun. 23, 1983, abandoned.

[51] Int. Cl.⁴ .............................................. B23K 11/06
[52] U.S. Cl. ......................................... 219/62; 219/67
[58] Field of Search .............................. 219/62, 67, 83

[56] References Cited

U.S. PATENT DOCUMENTS 2,265,943 12/1941 Laig ..................................... 219/106
3,178,550 4/1965 Eggert, Jr. ............................. 219/62
3,697,718 10/1972 Von Hollen et al. .................. 219/62

FOREIGN PATENT DOCUMENTS 2843986 2/1980 Fed. Rep. of Germany ........ 219/62
52-72353 6/1977 Japan .
411514 6/1934 United Kingdom ................. 219/67
492361 3/1976 U.S.S.R. ................................. 219/62

OTHER PUBLICATIONS

Cary, Howard B., *Modern Welding Techology*, 1979, p. 539.

Primary Examiner—E. A. Goldberg
Assistant Examiner—C. M. Sigda
Attorney, Agent, or Firm—Wenderoth, Lind & Ponack

[57] ABSTRACT

In the manufacture of spiral-welded steel pipe, material strip or plate is fed in its longitudinal direction and continuously formed into spiral pipe form. One side-edge of the strip and the other side-edge of the strip that has already been spirally formed are welded together by the electric-resistance method where they meet. The edges of the strip and formed pipe are held together simultaneously with or immediately after the electric-resistance welding from both inside and outside the pipe using a pair of pressure rolls. The bead formed as a result of the electric-resistance welding is reformed simultaneously with or immediately after the holding by the pressure rolls is accomplished. Then, the electric-resistance welded side-ends are welded again by the arc method.

2 Claims, 16 Drawing Figures

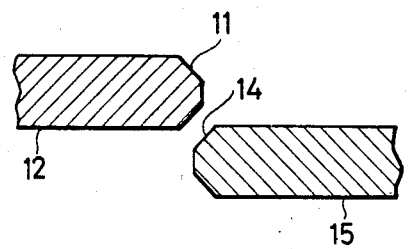
FIG. 4a
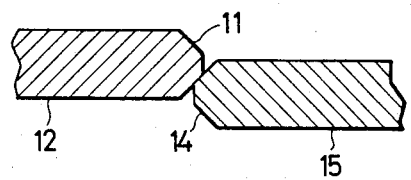
FIG. 4b
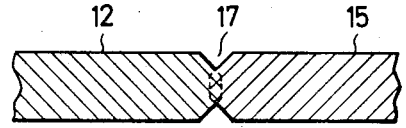
FIG. 4c
FIG. 5
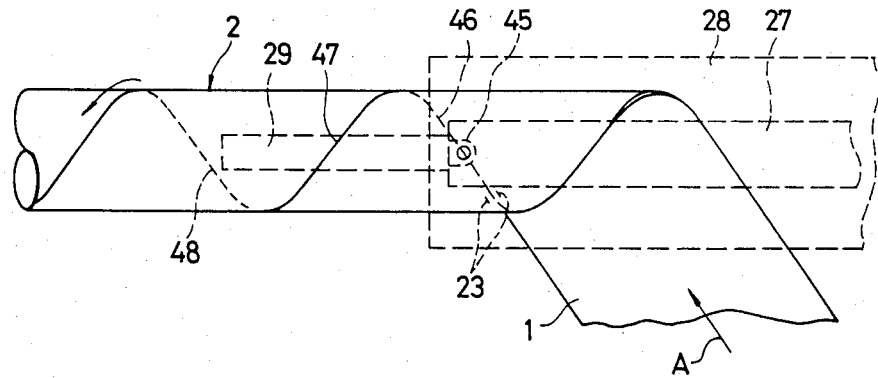

METHOD FOR MANUFACTURING SPIRAL-WELDED STEEL PIPE

This application is a continuation, of now abandoned application Ser. No. 507,225, filed June 23, 1983.

BACKGROUND OF THE INVENTION

This invention relates to a method for manufacturing spiral-welded steel pipe using hot-rolled steel strip or plate as material.

Spiral-welded steel pipe is manufactured on a spiral-welded pipe mill where strip or plate is continuously formed into spiral pipe form and the abutting side edges thereof are welded together to close the spiral seam. Welding is commonly performed by the submerged-arc method because it provides good bead form and several other advantages.

Yet, submerged-arc welding is not without some problems. Carried out on the spiral-welded pipe mill, the speed of welding is limited (approximately 3 m/min maximum), imposing considerable restrictions on productivity. Blowholes and other internal defects resulting from the intake of air lower the quality of the welded zone.

In order to enhance the welding speed and weld quality, attempts have been made to weld the seam by the multi-wire submerged-arc method. With inside submerged-arc welding carried out simultaneously with forming, however, it has been difficult to choose an appropriate welding position and, therefore, enhance the welding speed and weld quality.

In order to increase the welding speed, inside and outside welding are usually conducted at points 7 and 8 that are situated on the upstream (or minus) side, which is opposite to the direction in which the seam 5 of a spiral pipe 2 advances, of the lowermost point 3 and the uppermost point 4 of the pipe 2 respectively, as shown in FIGS. 1 and 2. The reason why such welding positions 7 and 8 are chosen is that a weld made on the downstream (or plus) side would reach an inclined position before there is enough time for the steel melted by the welding heat to solidify. As a consequence, the molten steel would flow out entailing an imperfect bead form. In other words, the welding positions 7 and 8, which might be situated on the plus side when welding is performed at lower speed, must be shifted to the minus side as the welding speed increases. As the welding speed is increased, the distance $L\cos\theta$ between the inside welding position 7 and the lowermost point 3 and the distance $L'\cos\theta$ between the outside welding position 8 and the uppermost point 4 grow larger.

However, it should be noted that inside welding is effected at a point where one side-edge of strip 1 that comes into the line tangentially to the pipe 2 meets the rearmost side-edge of the formed pipe 2. Increasing the distance $L\cos\theta$, therefore, enlarges the gap between the two side-edges, with a resulting melt-down or other imperfect welding.

For the enhancement of productivity, it has been proposed to provide continuous high-speed tack welding by the $CO_2$ gas shielded arc method on a spiral-welded pipe mill and then a submerged-arc welding off the line.

With this method also, the probability of blow-holes and other defects developing is strong. In addition, it is necessary to remove a large quantity of spatter and get rid of noxious gases and fumes. Although the welding speed of this method (approximately 9 m/min maximum) is higher than that of submerged-arc welding, still higher speed has become desirable in order to attain greater productivity.

SUMMARY OF THE INVENTION

An object of this invention is to provide a method of manufacturing spiral-welded steel pipe having a weld of excellent quality with a high welding speed.

Another object of this invention is to provide a method of manufacturing spiral-welded steel pipe that permits a free choice of the position of welding the inside seam of the pipe, thereby precluding the welding speed from being limited by the welding position.

According to the method of this invention, strip being fed in the longitudinal direction thereof is continuously spirally bent into round pipe form, with one side-edge of the strip and the rearmost side-edge of the formed pipe being electric-resistance welded at a point where both side-edges meet. Both edges are held from inside and outside the pipe by a pair of pressure rolls either at the same time as or immediately after said electric-resistance welding. The resulting weld bead is reformed either simultaneously with or immediately after said edge holding. The electric-resistance welded side-edges are than subjected to arc welding.

The method of this invention perfectly prevents the development of blowholes and other internal defects in the weld conventionally caused by the application of submerged-arc or $CO_2$ gas shielded arc welding because the meeting side-ends are first welded together by the electric-resistance method as mentioned before. Holding the joint with the pressure rolls simultaneously with or immediately after said electric-resistance welding prevents the pipe from being imperfectly formed as a result of peaking or offsetting, which, in turn, permits attaining the desired pipe outside diameter with high precision.

At a high welding speed, electric-resistance welding provides much greater throat thickness than arc welding. This permits adjusting the amount of penetration in the subsequent arc welding depending upon the required quality of the product pipe. Welding speed can be increased by reducing the amount of penetration.

Arc welding is performed after properly reforming the bead formed by the preceding electric-resistance welding in order to avoid the variation in arc length which could occur if said bead were unsmooth and which could lead to defective welding.

Since arc welding is preceded by electric-resistance welding, it is possible to select the welding position for the inside seam as desired, without being restrained by the welding speed.

The method of this invention can be implemented using a conventional spiral-welded pipe mill to which only an electric-resistance welder, pressure rolls and a bead reformer are added. This allows a great saving in capital investment. Compared with the conventional method, this method permits a substantial increase in spiral pipe production with the same number of workers.

BRIEF DESCRPITION OF THE DRAWINGS

FIGS. 4(a) through 4(c) are enlarged cross-sectional views showing how the strip side-edges are brought together and welded.

FIG. 5 is a schematic plan view showing an example of a spiral-welded pipe mill for use in implementing the method of this invention.

Figure 6:
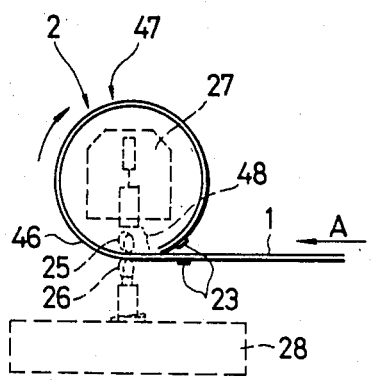

FIG. 6 is a front view showing the spiral-welded pipe mill shown in FIG. 5.

Figure 7:
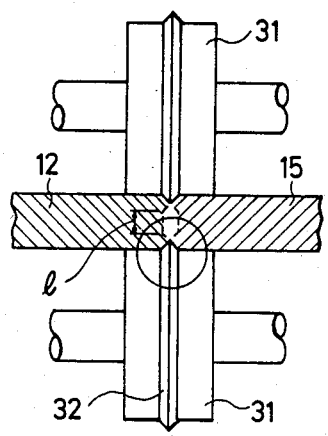
Figure 7A:
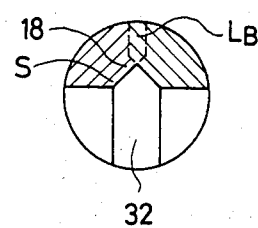

FIG. 7 is a front view showing an example of a pressure roll, and FIG. 7(a) is an enlarged view of part of the same pressure roll.

Figure 8:
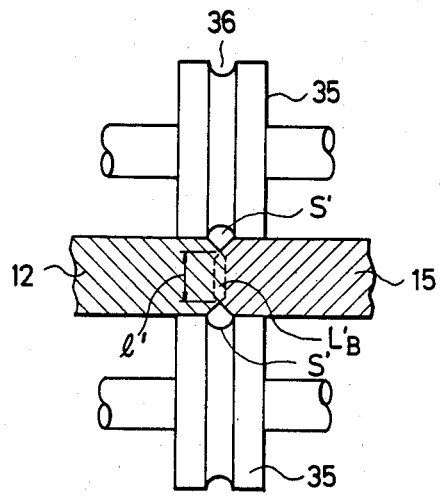

FIG. 8 is a front view showing another example of a pressure roll.

Figure 9:
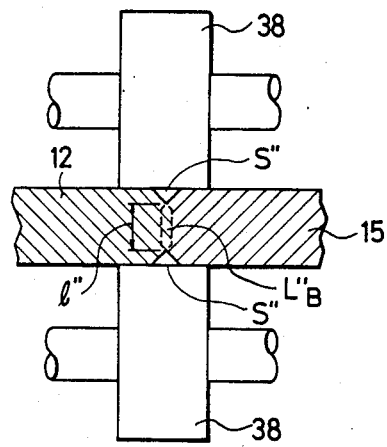

FIG. 9 is a front view showing still another example of a pressure roll.

Figure 10:
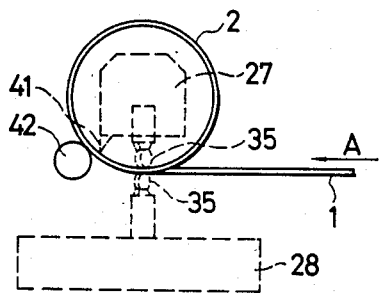

FIG. 10 shows how the bead is reformed by removing part thereof.

Figure 11:
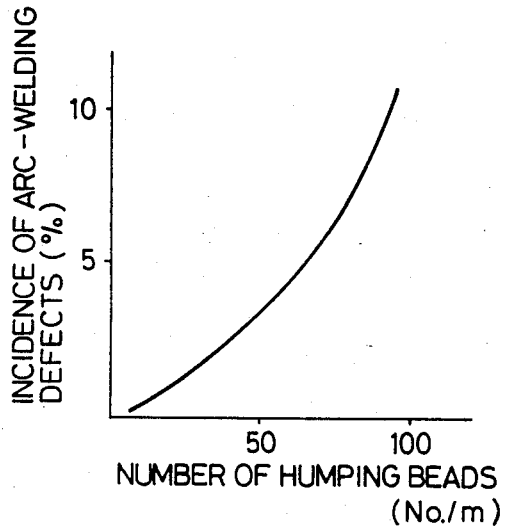
Figure 12:
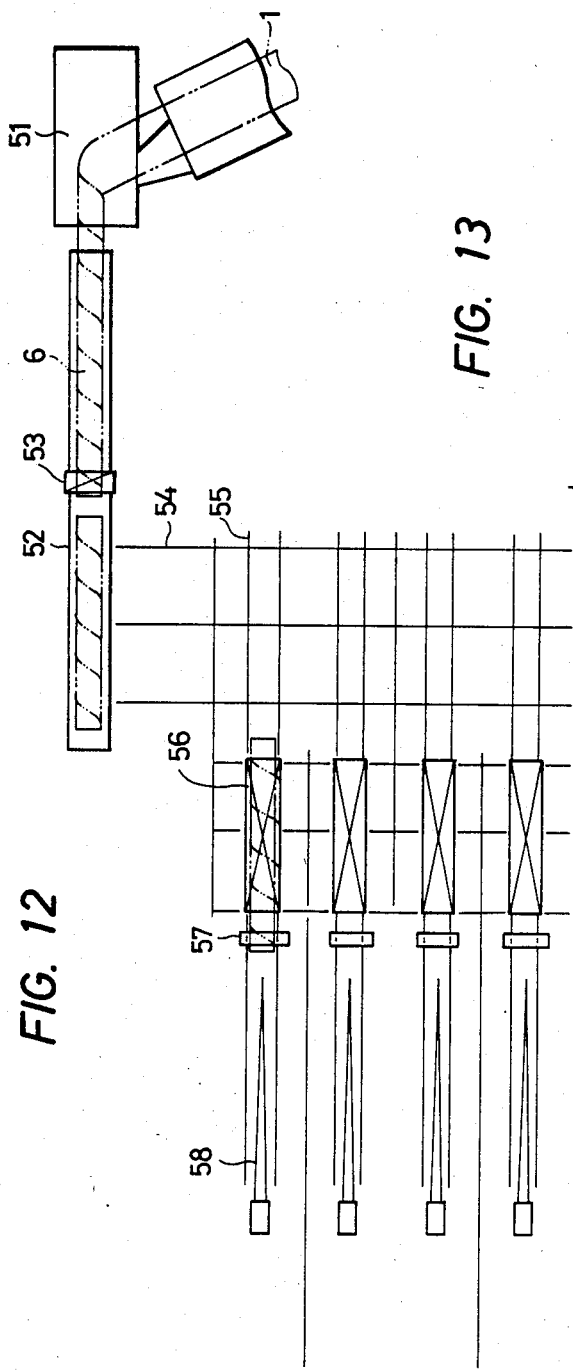

FIG. 11 is a graph showing the relationship between the number of humping beads and the incidence of arc-welding defects, FIG. 12 is a plant layout diagram showing how on-line electric-resistance welding and off-line arc welding are performed.

Figure 13:
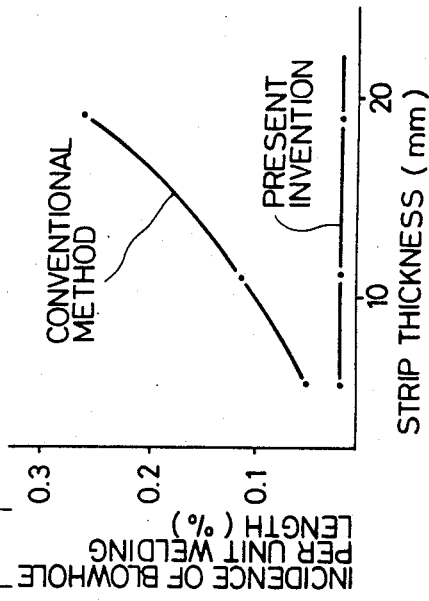

FIG. 13 is a graph the incidence of blowholes resulting from the method of this invention as compared with that from the conventional method.

DETAILED DESCRIPTION OF THE PREFERRED EMBODIMENTS

Figure 1:
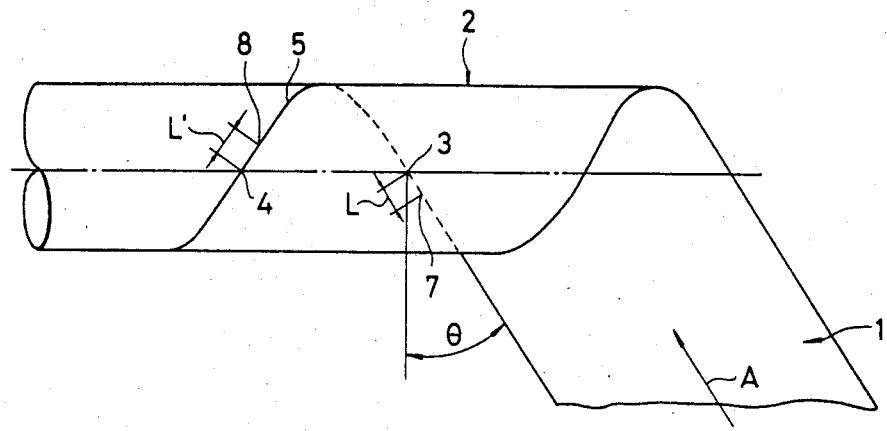
FIG. 1 is a plan view of a pipe being manufactured by the conventional method.
Figure 2:
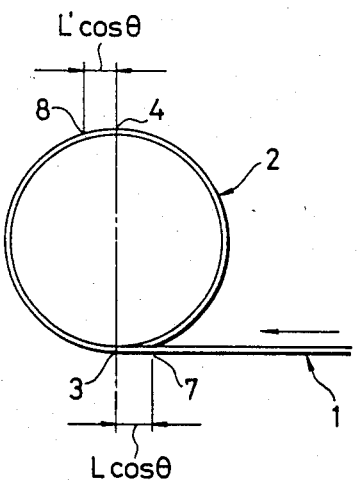
FIG. 2 is a front view of the pipe shown in FIG. 1.
Figure 3:
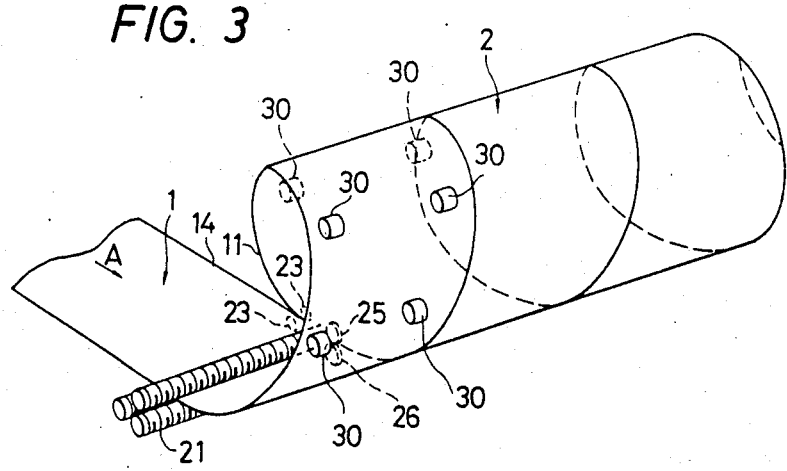
FIG. 3 is a perspective view showing a pipe being manufactured by the method of this invention, along with the principal part of a spiral-welded pipe mill according to this invention.

As shown in FIG. 3, flat strip 1 is fed, as indicated by arrow A, into a gap formed by three forming rolls 21 that are disposed at the vertexes of a triangle. The forming rolls 21 spirally form the strip 1 that is fed aslant to the axis of a pipe 2 to be manufactured.

The preceding side-edge 11 of the spirally formed strip 1 meets the following side-edge 14 on the other side of the same strip where the forming rolls 21 are provided, with one side-edge slightly overlapping the other. The two side-edges and 11, 14 are subjected to electric-resistance welding there. Electric-resistance welding is carried out by means of resistance heating that is achieved by supplying high- or medium-frequency welding current to the two edges. The welding current to the edges is supplied by a pair of contact tips 23 that are provided outside the pipe and on the entry side of the forming rolls 21.

The position where electric-resistance welding is performed corresponds to that where internal welding according to the conventional spiral-welded pipe manufacturing method has been conducted.

FIGS. 4(a) through 4(c) show a process in which the side-edges 11 and 14 of the strip are gradually brought into contact and welded by the electric-resistance method.

An x-shaped groove is cut at each of the side-edge 14 and the other side-edge 11 that has been already spirally formed. As the strip advances, the preceding side-edge 11 descends, as shown in FIGS. 4(a) and 4(b), to meet the following side-edge 14 to accomplish electric-resistane welding.

Both side-edges 11 and 14 must be properly aligned and pressed together as shown in FIG. 4(c). To achieve this close contact, both edges 12 and 15 are held together from both inside and outside the pipe by a pair of upper and lower pressure rolls 25 and 26 simultaneously with or immediately after said welding operation, as shown in FIGS. 3, and 6. As illustrated in FIG. 6, the internal pressure roll 25 is attached to an internal forming beam 27 while the external pressure roll 26 is fastened to a forming machine 28.

With both edges thus held by the pressure rolls 25 and 26 pipe deformation, such as offsetting and peaking, is prevented. The pressure rolls 25 and 26 must apply adequate pressure to effectively squeeze together the two side-edges 11 and 14.

Although the pressure rolls 25 and 26 discussed here are not driven, they may be driven in the direction in which the strip 1 advances.

Since the side-edges 11 and 14 are held closely and deformed under pressure as shown in FIG. 4(c), the shape of the bead 17 is not symmetrical with respect to the seam. This asymmetricalness becomes more pronounced as strip thickness increases. If the shape of the bead 17 is not uniform and smooth, it is impossible to maintain a steady welding condition in the following arc welding, with the arc length varying with the bead irregularities. The result is the development of slug inclusion and/or blowholes in the weld.

The method according to this invention solves this problem by reforming the bead protruding inside or outside the pipe at the same time as or immediately after said edge holding. Reforming is accomplished either by correcting the bead form with the use of said pressure rolls or by removing the excess bead by machining, grinding, plasma-arc cutting or other methods.

FIG. 7 shows the edge 15 of the strip and the edge 12 of the formed pipe which are welded together by the electric-resistance method and held together at a point 45 directly above or below the center axis of the spiral-welded pipe (see FIG. 5) using a pair of vertically disposed pressure rolls 31. FIG. 7(a) is an enlargement of part of FIG. 7.

The molten steel at a butt joint $L_B$ having a thickness l forms a bead 18 in a space S left between the projection 32 of the pressure rolls 31 and the x-shaped groove.

FIG. 8 shows a pressurized condition in which the butt joint thickness is increased from l to l' (l<'). In this case, the volume v' of the molten steel at the butt joint $L_B'$ is larger than the volume V' of the space S' (v'>V'), with the result that the molten steel flows out of the groove. In order to prevent this outflow and the ensuing formation of a step at the butt joint, a groove 36 is provided on the pressure rolls 35.

FIG. 9 shows a intermediate condition between those shown in FIGS. 7 and 8, in which flat-surfaced pressure rolls 38 are used.

A pressure roll of a suitable shape is chosen so that the volume v, v' or v'' at the butt joint $L_B$, $L_B'$ or $L_b''$ is smaller than the volume V, V' or V'' of the space S, S' or S'' left between the groove and pressure rolls (i.e., v<V, v'<V' or v''<V'').

It is also possible to cut asymmetrical grooves on the inside and outside of the pipe. Namely, a deeper groove is provided on the inside than on the outside, thereby reducing the quantity of excess bead on the inside. This permits using a flat-surface pressure roll on the inside and a projecting one shown in FIG. 7 on the outside. Then the excess bead outflown on the outside is reformed by machining, grinding or plasma-arc cutting. This method is applicable where the internal bead reforming is difficult to achieve.

In an embodiment shown in FIG. 10, the bead is reformed using a pair of pressure rolls 35 and then part of the bead is removed using a cutting tool 41 on the inside and a milling cutter 42 on the outside, thereby facilitating the subsequent arc welding.

This bead removal may be effected at any point so long as it falls somewhere between the position where said pressure rolls are provided and the position where the external or internal arc welding is performed. From the viewpoint of energy conservation, however, it is preferable to accomplish the bead removal while the bead is still relatively soft at or in the vicinity of a point 46 immediately after the completion of the electric-resistance welding. The reforming and machining of the bead formed by the electric-resistance welding is indispensable to the success of the subsequent arc welding.

FIG. 11 shows the relationship between the number of outflown beads (humping beads) resulting from the electric-resistance welding and the incidence of internal defects in the weld developed as a result of the subsequent arc welding. This data shows how the humping beads caused by the preceding electric-resistance welding affect the result of the subsequent arc welding.

The bead reforming is followed by the arc welding. In FIGS. 5 and 6, reference numeral 47 shows a point where external arc welding is performed as in the conventional method. Reference numeral 29 designates a welding beam carrying an internal arc welder (not shown) at the forward end thereof, the internal arc welding being performed at a point 48 that is approximately one turn beyond the welding position of the conventional method. The external and internal welding positions each may be one more turn beyond the points 47 and 48 respectively. The order in which the external and internal welding are performed differs with the type of the forming operation. When the position of the strip is reversed from that shown in FIG. 4, the order of the external and internal welding also may be reversed.

Arc welding may be performed by any of the submerged-arc, inert-gas shielded metal arc, $CO_2$ gas shielded arc, inert-gas shielded tungusten arc and other methods.

When the welded joint is thus pressed from above and below by the pressure rolls 25 and 26, the pipe 2 exhibits a tendency to slightly flatten in the horizontal direction. This tendency can be effectively prevented by providing bridle rolls 30 as shown in FIG. 3. The bridle rolls 30 are disposed in such a manner as to press the pipe 2 from outside exactly transversely. Namely a first pair of bridle rolls 30 are positioned approximately 90 degrees away from the pressure rolls 25 and 26 over the circumference, which are followed by a suitable number of pairs spaced at appropriate angular intervals. The bridle rolls 30 restrain the transverse deformation of the pipe 2, thereby preventing the flattening thereof and enhancing the squeezing effect of the pressure rolls 25 and 26. Yet, provision of the bridle rolls 30 is not necessarily an indispensable requisite.

FIG. 12 shows another embodiment of this invention in which a semi-finished spirally formed pipe prepared by use of electric-resistance welding, holding pressure rolls and bead reforming is cut into lengths and arc-welded out of line.

A delivery device 52 extends from a spiral-welded pipe mill 51, with a flying gas cutter 53 provided next thereto.

A transfer system 54 extends sideways from the delivery device 52 and four welding lines 55 are disposed at right angles thereto. Each of the welding lines 55 comprises a travelling car 56, an external arc welder 57, and an internal welder 58.

The strip 1 is continuously formed into a semifinished pipe 6 in the spiral-welded pipe mill 51 and sent into the delivery device 52.

The delivery device 54 sends the semi-finished pipe 6 cut into the desired length by the flying gas cutter 53 to the welding line 55 where the arc welders 57 and 58 provide the external and internal welding to accomplish the manufacture of a spiral-welded pipe.

The number of the welding lines must be large enough to assure a welding speed equivalent to or faster than that of the preceding electric-resistance welding.

FIG. 13 is a graph in which the method of this invention is compared with the conventional method, with the strip thickness plotted as abscissa and the incidence (%) of defects per unit welding length as ordinate. As is evident, the method of this invention surpasses the conventional method in great measure. This superiority is ascribable to the fact that the electric-resistance tack welding of the formed pipe and strip side-edges prior to the arc welding prevents the detachment of the strip form the formed pipe under the influence of elasticity, that the subsequent arc-welding can be performed in the optimum position, and that a satisfactory weld is formed as a result of the bead reforming which permits keeping a steady distance between the welding rod and the bead or base metal during the arc-welding.

This method can be implemented not only on a new mill but also on an existing spiral-welded pipe mill of the conventional type if an electric-resistance welder, pressure rolls and a bead reformer that removes part of the bead are added and the position of the existing arc-welder is appropriately changed.

What is claimed is:

1. A method of manufacturing spiral-welded steel pipe which comprises the steps of:
    continuously feeding strip in the longitudinal direction thereof and forming the strip into spiral pipe form;
    lapping one side edge of the strip on or under the other side edge thereof which has already been spirally formed to define a welding groove, and subjecting the lapped joint to electric resistance welding which forms a bead on the edges of the strips on the inside and outside of the formed pipe;
    pressing together the edges of the strip and formed pipe from outside and inside the formed pipe and reforming the bead formed on the edges of the strip on the inside and outside of the pipe during said electric resistance welding by providing a pair or pressure rolls each having a groove along the middle of the peripheral surface thereof, the groove having a shape which, together with said welding groove, provides a volume greater than the volume of molten steel at the joint, and applying the edges of the peripheral surface of each said pressure roll to the surfaces of the strips or opposite sides of the welding groove on the outside and inside of the formed pipe simultaneously with or immediately after said electric resistance welding for causing the molten steel of the electric resistance welded bead to be accommodated only in the grooves, whereby the formation of a step at the edges of the strip is prevented; and
    carrying out in-line submerged arc welding on the edges of the strip with the reformed bead on the inside and outside of the pipe.

2. A method according to claim 1 in which said bead reforming further comprises removing part of the bead.

* * * * *